UNITED STATES PATENT OFFICE.

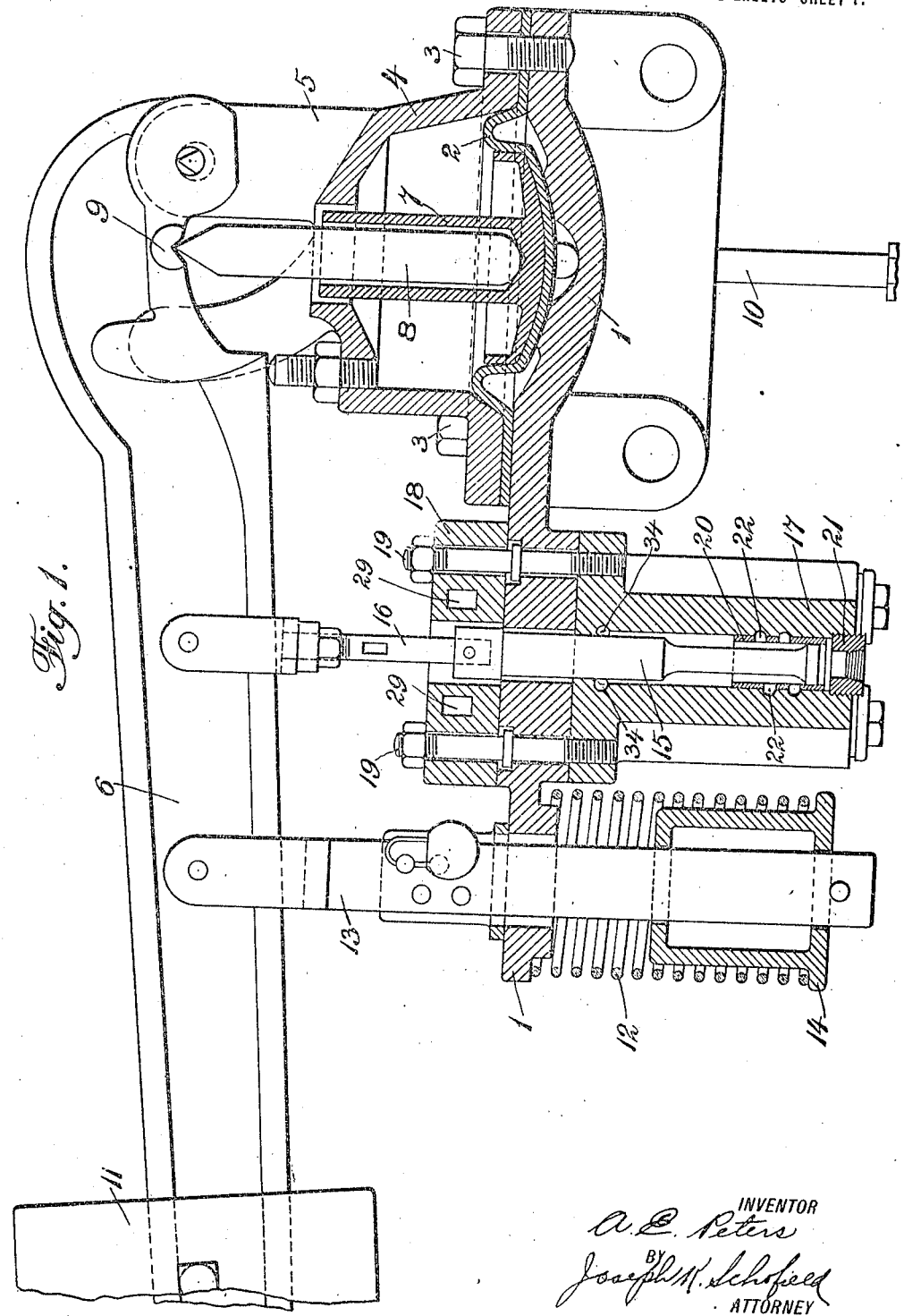

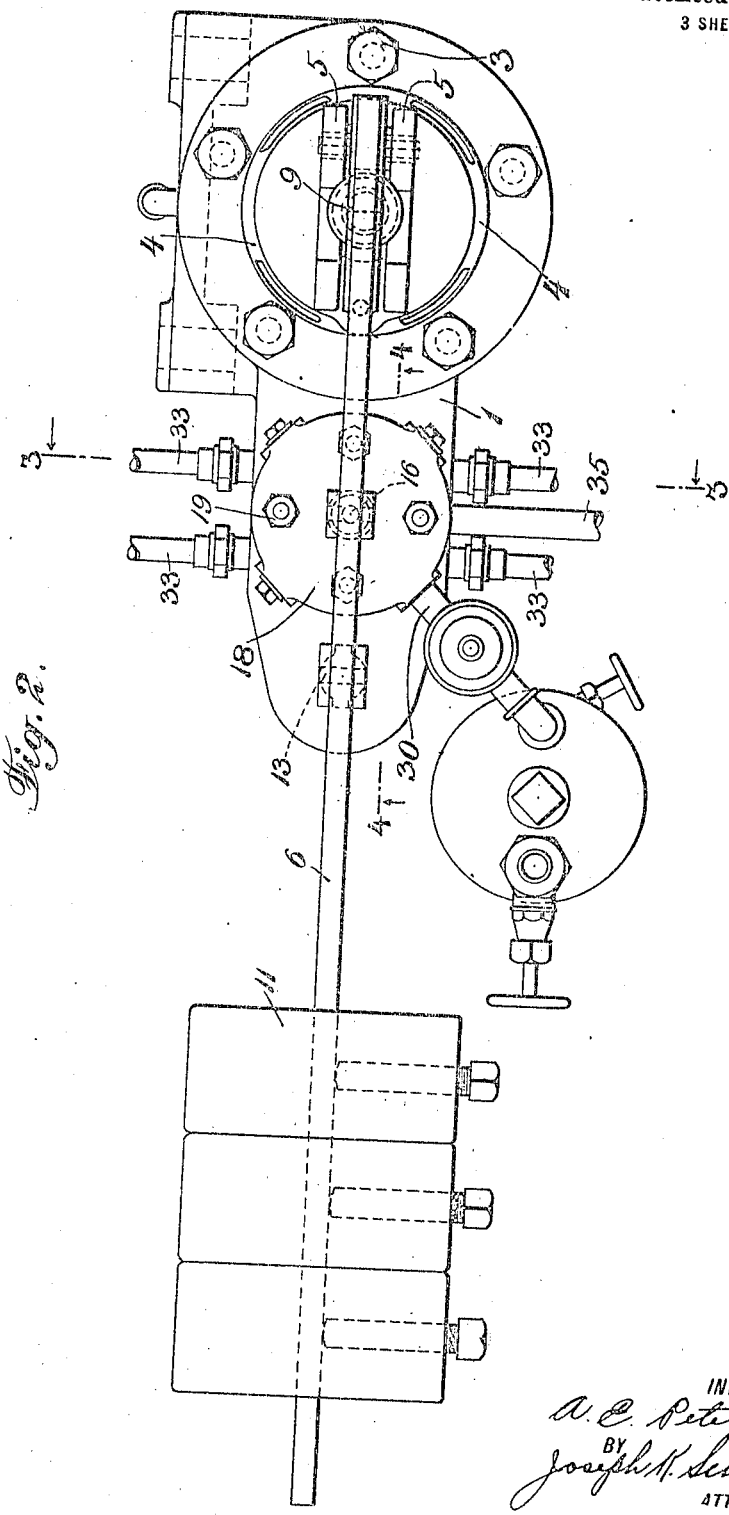

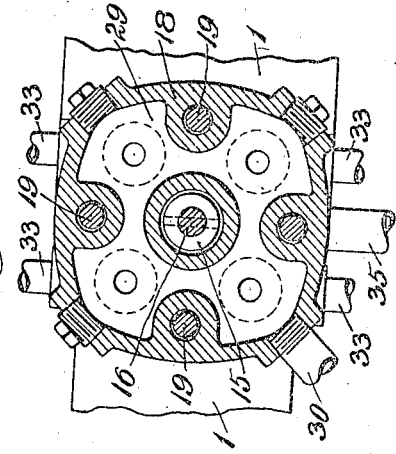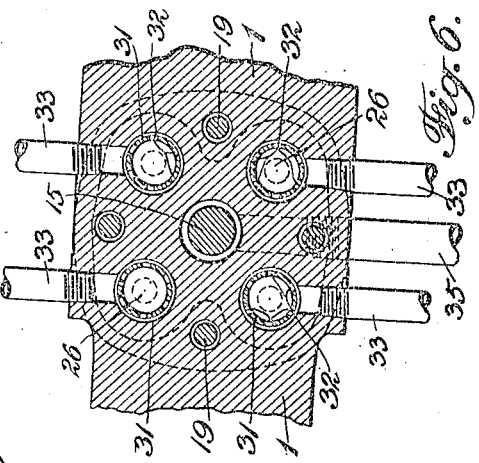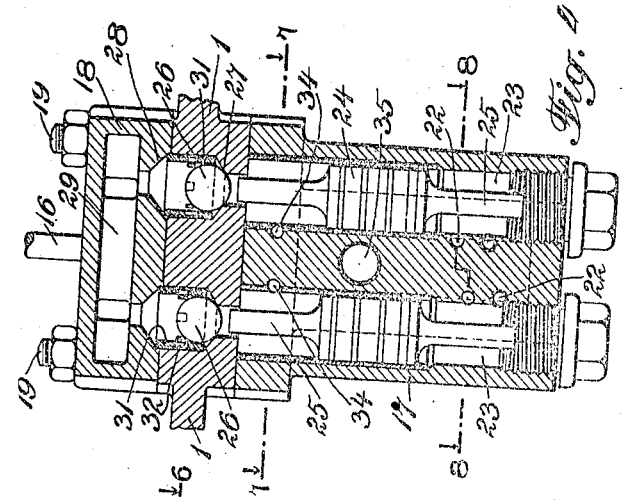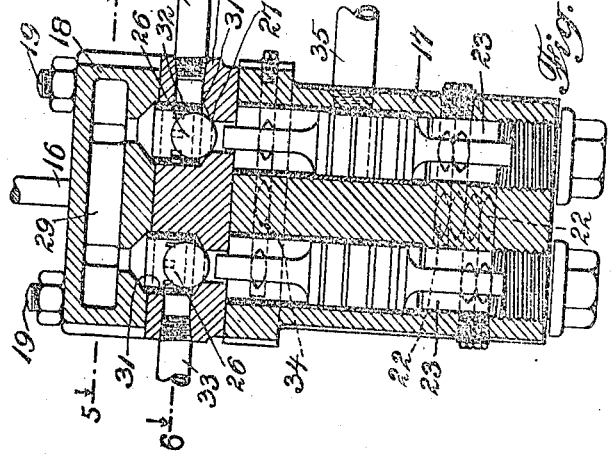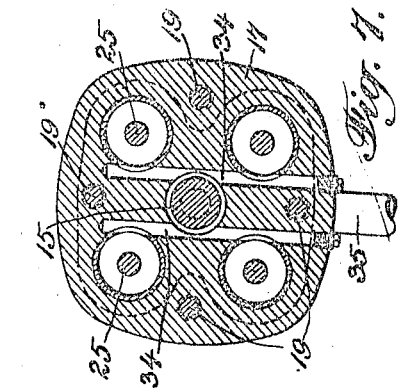

ARTHUR E. PETERS, OF EASTON, PENNSYLVANIA, ASSIGNOR TO INGERSOLL-RAND COMPANY, OF JERSEY CITY, NEW JERSEY, A CORPORATION OF NEW JERSEY.

REGULATOR FOR COMPRESSOR-UNLOADERS.

1,261,607. Specification of Letters Patent. Patented Apr. 2, 1918.

Application filed May 26, 1917. Serial No. 171,234.

*To all whom it may concern:*

Be it known that I, ARTHUR E. PETERS, a citizen of the United States, residing at Easton, in the county of Northampton and State of Pennsylvania, have invented a certain new and useful Improvement in Regulators for Compressor-Unloaders, of which the following is a specification.

This invention relates to a regulator or unloader adapted to maintain a constant pressure in the discharge line of an air or gas compressor and in particular to a regulator or unloader of the type disclosed in the patent to William Prellwitz, No. 1,027,757 granted May 28th, 1912, of which the present invention is an improvement.

The objects of the present invention are to improve and simplify the regulator body disclosed in the above mentioned patent; further, to provide plunger means for controlling the admission and exhaust of fluid to and from unloading valves mounted in the compressor so that these unloading valves may be operated in a step by step manner; further, to provide a pressure operated pilot valve controlling the plungers to open and close valves to admit and exhaust fluid pressure to and from said unloading valves, one after the other, as the pilot valves moves within its cylinder.

With these and other objects in view, my invention consists in the features of construction and operation set forth in the following specification and illustrated in the drawing.

In the drawings annexed hereto and forming a part hereof,

Figure 1 is a view of the complete regulator shown in cross section;

Fig. 2, a top plan view of the regulator;

Fig. 3, a cross sectional view of the regulator body taken on the line 3—3 of Fig. 2;

Fig. 4, a similar cross sectional view taken on the line 4—4 of Fig. 2;

Fig. 5, a cross sectional view taken on the line 5—5 of Fig. 3;

Fig. 6, a similar view on the line 6—6 of Fig. 3;

Fig. 7, a similar view on the line 7—7 of Fig. 4; and

Fig. 8, a similar view on the line 8—8 of Fig. 4.

Referring more particularly to the drawings, 1 shows the main supporting member of the regulator which is adapted to be conveniently mounted on or near the compressor cylinder. The supporting member is provided at one end with a diaphragm 2 clamped at its periphery by means of studs to a housing 4 forming a support for a standard 5 to which is pivoted a weighted arm 6 which will be more fully described as the description proceeds. Resting on the diaphragm 2 is a diaphragm head 7 which rises and falls with the diaphragm and also forms a bearing for an arm 8 pivoted at its upper extremity to the arm 6 at 9. Fluid pressure is admitted below the diaphragm 2 by means of a conduit 10. It will thus be seen from the above construction that the pressure supplied below the diaphragm 2 will force the diaphragm head and consequently the arm 6 upwardly. The pressure to raise this diaphragm 2 and arm 6 may be increased and regulated by the addition of weights 11 movably mounted on the arm 6 and also by auxiliary means comprising a spring 12 which will be more and more compressed as the arm 6 moves upwardly, said spring being connected to the arm 6 by means of a reach arm 13 and foot piece 14.

Connected to the arm 6 at an intermediate point is a pilot valve 15 which moves upwardly and downwardly in accordance with the movements of the arm 6. This pilot valve 15 is adjustably connected to arm 6 by means of a reach arm 16. Depending from the body member 1 is a valve casing 16 whose central portion is in alinement with the valve 15 and above the body member and also in alinement with the valve casing 17 is a cap member 18 both of which members are secured rigidly to the supporting member 1 by means of studs 19. The construction of the valve casing 17 is shown more clearly in Figs. 3 and 4 in which are shown the auxiliary valves and plungers by means of which fluid pressure is supplied to the clearance controlling valves to unload the compressor. Preferably, the cylinder in which the valve 15 operates is bushed as shown at 20 and at its lower end is in communication with a connection 21 by means of which discharge line pressure is admitted to the bushed cylinder 20 below the lower end of the valve 15. At spaced points along the bushed cylinder 20 are provided passages 22 each leading to a different auxiliary cylinder 23 arranged in proximity to and parallel with the bushed cylinder 20. In the construction shown four of these auxiliary cylinders 23 are used but this number may be increased or diminished according to the desirability of unloading and loading the compressor in a greater or less number of steps.

Within each of the auxiliary cylinders 23 is a plunger 24 closely fitting the cylinders and slidable within them. These plungers are each provided with extensions 25 to hold an enlarged central portion above the orifice of the passage 22 and to extend from the central portion up to within striking distance of a ball 26 forming a valve just above each of the auxiliary cylinders 23 seating against a valve seat 27 formed in the supporting member 1. Above the valve casing and securely fastened thereto by means of studs 19 is the cap member 18 which is hollowed out and provided on its lower face with valve seats 28 directly above the valve seats 27. Above the valve seat 28 is a hole extending from the valve seat 28 to the hollow portion 29 of the cap member 18. Pressure is supplied to the cap member 18 through a conduit 30. Preferably, each of the cylinders in which the ball valves 26 operate are bushed as shown in Figs. 3 and 4 the bushings 31 being provided with orifices 32 in communication with a pipe 33 leading to the clearance controlling valves mounted on the compressor similar in every way to the pipes 26, 29, 32, 35, shown in the patent to Prellwitz, referred to above. Below the balls 26 are provided passages 34 connecting each of the cylinders 23 with the pilot valve cylinder which in turn is in communication with the atmosphere through pipe 35.

The operation of the regulator will now be explained. It will be obvious from the above description that when the pressure of the compressed air or other fluid reaches a critical pressure which may be varied by adjustment of weights 11 the diaphragm 2 and consequently the arm 6 is forced upwardly by means of the fluid pressure below the diaphragm 2. This movement of the arm raises the pilot valve 15 in the bushed cylinder 20, which movement will be continued as long as the pressure remains above the critical pressure. When the pilot valve 15 has moved upwardly sufficient for the lower edge to uncover the lowermost passage 22 fluid pressure which is constantly present below the valve 15 will be admitted to one of the auxiliary cylinders 23 which will have the effect of raising the plunger 24 within that cylinder to force the ball 26 from the seat 27 and force it against the seat 28 in the cap member 18. This movement of the valve 26 will have the effect of cutting off the supply of fluid pressure from the hollowed portion of the cap 18. Simultaneously with cutting off the supply of fluid from one of the pipes 33 the movement of the ball 26 opens communication with atmosphere through one of the passages 34 and pipe 35. When pressure within one of the pipes 33 is thus lowered the clearance controlling valve mounted on the compressor operates to partially unload the compressor in a similar manner to that in the patent to Prellwitz referred to above. After one of the balls 26 has operated in the manner above described if the pressure in the discharge line continues to rise due to continued light demand on the discharge line, then a slight further movement of the arm 6 raises the pilot valve 15 to uncover the conduit or passage 22 leading to another plunger cylinder 23 and a consequent movement of a second plunger 22 and consequent further unloading of the compressor. This series of operations may be continued until each of the plungers 22 has been operated, which will result in the complete unloading of the compressor.

It is to be understood that while the present showing and description disclose only one specific embodiment of the present invention, other forms and modifications are included within the spirit and scope thereof, as expressed in the appended claims.

What I claim is:

1. In a regulator for compressors, a pilot valve, pressure operated means to move said pilot valve, a plurality of plungers controlled by said pilot valve and arranged to be operated one after the other as the pilot valve moves from one extreme of its movement to the other, said plungers opening and closing valves admitting fluid pressure to clearance controlling valves mounted on the compressor cylinder.

2. In a regulator for compressors, a pilot valve, pressure operated means to move said pilot valve, a plurality of independently operated plungers controlled by said pilot valve and arranged to be operated one after the other in accordance with movements of the pilot valve, said plungers opening and closing valves admitting fluid pressure to clearance controlling valves mounted on the compressor cylinder.

3. In a pressure regulator for compressors, a cylinder containing a pilot valve, pressure operated means to move said pilot valve, a plurality of cylinders adjacent said pilot valve, passages connecting said pilot valve cylinder with said plurality of cylinders, said passages intercepting said main pilot valve cylinder at different positions along the axis of said last named cylinder.

4. In a pressure regulator for compressors, a cylinder, a pilot valve within said cylinder, pressure operated means to move said pilot valve, a plurality of cylinders mounted adjacent and parallel with said first named cylinder and passages connecting the pilot valve cylinder with said adjacent cylinders, said passages being adapted to be opened one after the other as the pilot valve moves from one extreme of its movement to the other.

5. In a pressure regulator for compressors, a cylinder, a pilot valve within said cylinder, pressure operated means to move said pilot valve, a plurality of cylinders mounted adjacent and parallel with said first named cylinders, and passages connecting the pilot valve cylinder with said adjacent cylinders, a fluid pressure connection admitting pressure to said pilot valve cylinder below said pilot valve, the movement of the pilot valve admitting fluid pressure to said plurality of cylinders one after the other.

6. In a pressure regulator for compressors, a cylinder, a pilot valve within said cylinder, pressure operated means to move said pilot valve, a plurality of cylinders in proximity to said first named cylinder, passages connecting each of said adjacent cylinders to said pilot valve cylinder, said passages intercepting said pilot valve cylinder at points along its axis, means supplying fluid pressure below said pilot valve whereby said fluid pressure may be supplied to said adjacent cylinders one after the other as said pilot valve moves from one extreme of its movement to the other, pressure operated plungers in said adjacent cylinders adapted to open and close valves to admit and exhaust fluid pressure to clearance controlling valves mounted on the compressor.

7. In a pressure regulator for compressors, a cylinder, a pilot valve within said cylinder, pressure operated means to move said pilot valve, a plurality of cylinders in proximity to said first named cylinder, passages connecting each of said adjacent cylinders to said pilot valve cylinder, said passages intercepting said pilot valve cylinder at points along its axis, means supplying fluid pressure below said pilot valve whereby said fluid pressure may be supplied to said adjacent cylinders one after the other as said pilot valve moves from one extreme of its movement to the other, pressure operated plungers in said adjacent cylinders adapted to be moved to open and close valves to admit and exhaust fluid pressure to clearance controlling valves mounted on the compressor.

In testimony whereof, I have hereunto set my hand.

ARTHUR E. PETERS.